Jan. 28, 1969   C. S. MILLER ET AL   3,424,534
MICRODENSITOMETER
Filed June 3, 1964   Sheet 2 of 4
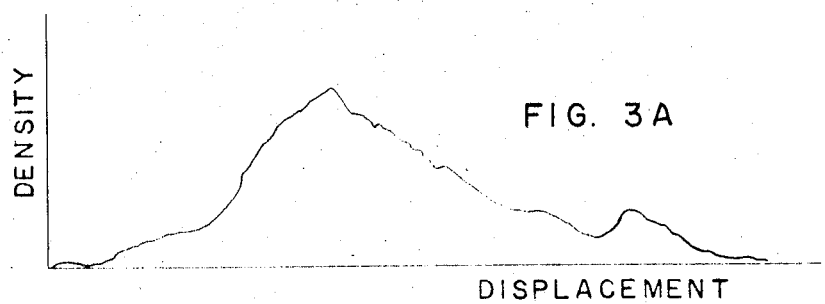
FIG. 3A
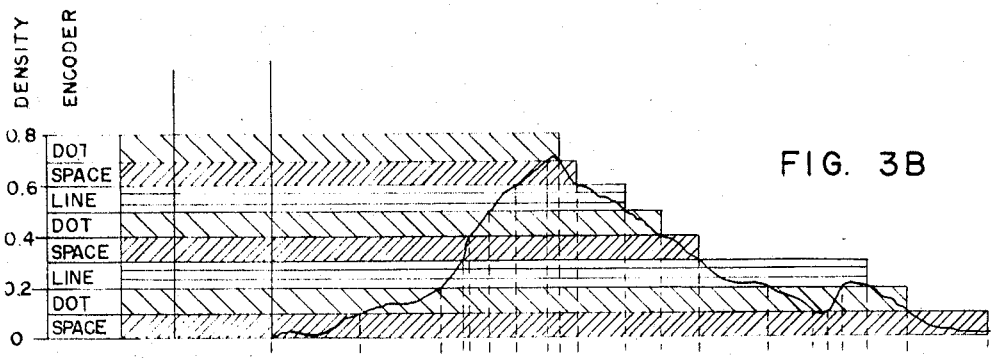
FIG. 3B
FIG. 3C
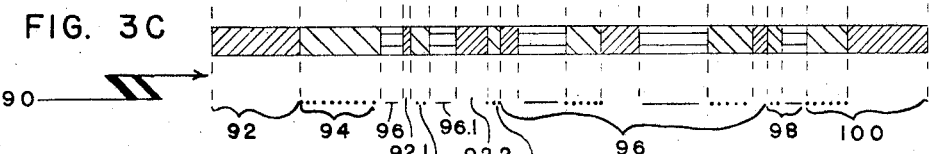
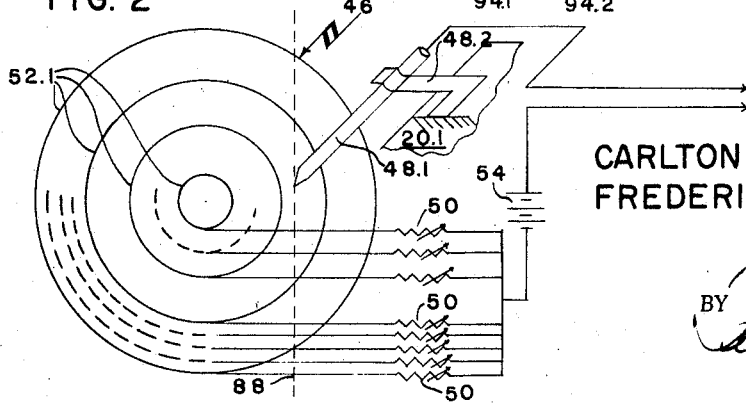
FIG. 2
CARLTON S. MILLER
FREDERICK G. PARSONS
INVENTORS
BY
ATTORNEYS

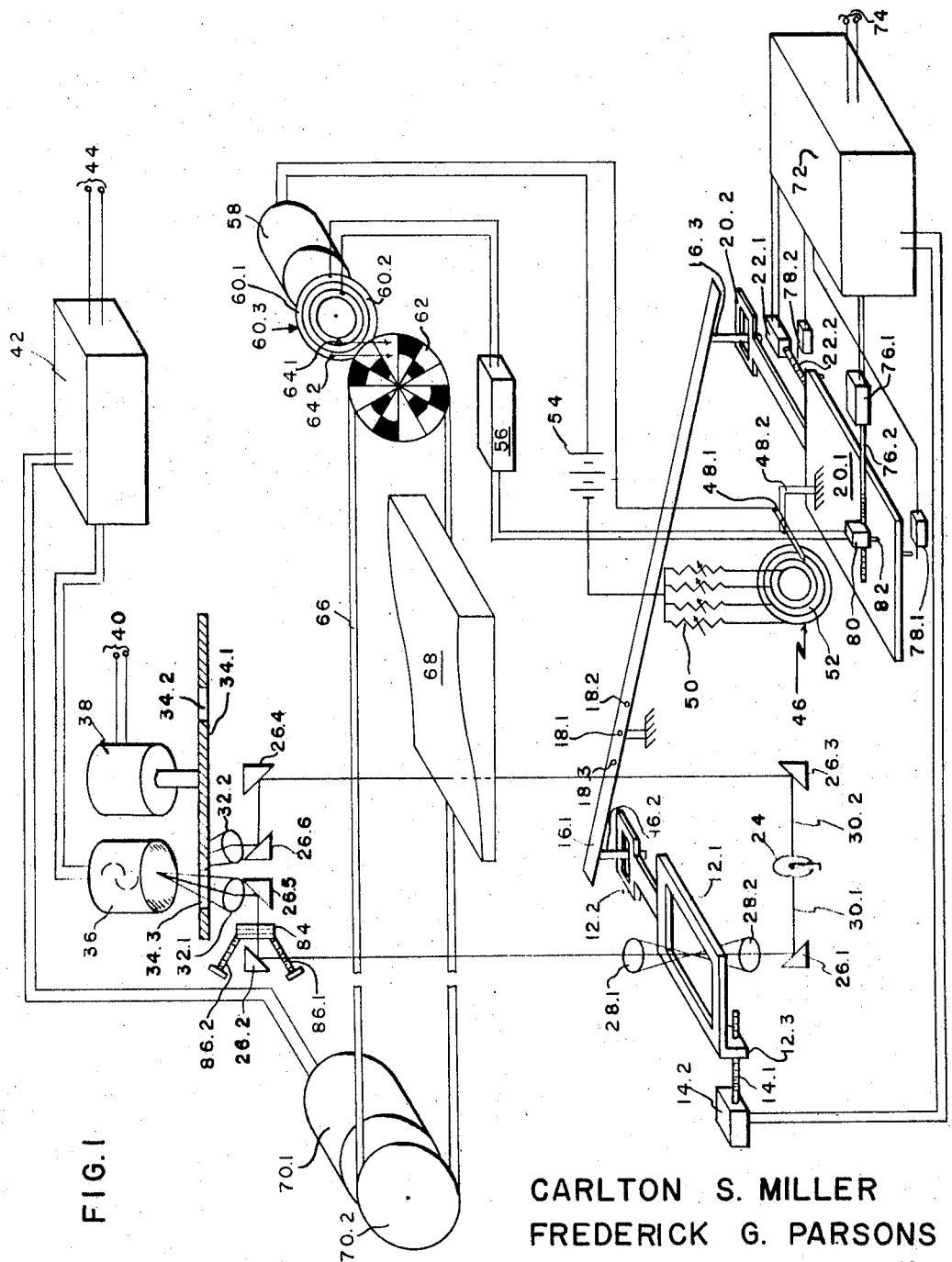

CARLTON S. MILLER
FREDERICK G. PARSONS
INVENTORS

Jan. 28, 1969 C. S. MILLER ET AL 3,424,534
MICRODENSITOMETER
Filed June 3, 1964 Sheet 4 of 4

CARLTON S. MILLER
FREDERICK G. PARSONS
*INVENTORS*

United States Patent Office 3,424,534
Patented Jan. 28, 1969

3,424,534
MICRODENSITOMETER
Carlton S. Miller, Bedford, and Frederick G. Parsons, Natick, Mass., assignors to Technical Operations, Incorporated, Burlington, Mass., a corporation of Delaware
Filed June 3, 1964, Ser. No. 372,239
U.S. Cl. 356—203　　　　　　　　　　　　6 Claims
Int. Cl. G01j *3/00;* G01n *21/00*

ABSTRACT OF THE DISCLOSURE

This disclosure depicts a method for producing isophote records from a photograph transparency record or the like. The disclosure further depicts novel apparatus for assisting in practicing the described method, comprising a microdensitometer for optically scanning a specimen carrying information in terms of density differences combined with a write-out device responsive to the microdensitometer for forming an isophote record characterizing the density variations in the scanned specimen. The disclosure further depicts an exemplary isophote record.

---

While, for purposes of discussion and illustration, our invention will be described in terms of analyzing radiographs, it is to be understood that the invention has equal applicability in any other field wherein it is desired to scan and plot, in two dimensions, changes in density-transmission or brightness characteristics of transparencies or photographic records, for example, in the photographic analysis of X-ray and radiographic film, biological specimen slides or astronomical objects such as eclipses and the like.

A photographic image may be considered as a large number of space-resolved photometer records of the apparent surface radiance of objects within the camera view. The optical density at a given resolution element on a developed negative can then be related to the brightness of the imaged solid angle of object space by application of the laws that govern the chemical processing of photographic materials and the physical light gathering power of lenses.

An X-ray film records the image of the attenuation of an X-ray beam as it passes through an object. The X-ray transmission characteristic of the object under study, along a given ray direction, is presented as optical density at the corresponding point on the developed negative. This is analog information that can be interpreted by the radiographer in such terms as the quality and quantity of the materials of a weld, the presence of cracks and/or voids or the quality of bonded materials. In many situations, a flaw in the X-rayed part becomes apparent in the film even to a casually trained observer while in another film, there may be just a barest showing that is so marginal that even the expert radiographer is hard pressed to decide whether or not the part does in fact have an imperfection.

While the usual qualitative observation of radiographic film may quickly reveal most of the pertinent photogrammetric (size-related) features of the radiographed object, it does not made full use of the photometric (transmission related) information on the negative. The human brain, in spite of its remarkable function as a computer, does not permit the radiographer or other individual reading the film to recognize objects and discontinuities that have too low a contrast compared to their surroundings, nor does it register the film density quantitatively. This extra level of information is present on the negative and can be extracted by appropriate microdensitometric analysis. However in the past, this extraction procedure has been both tedious, expensive and inaccurate.

While the human eye-brain combination is capable of recognizing for example, an optical-density step of less than 0.02 unit at a sharp edge, it is well known that if this density change takes place over much more than one-tenth millimeter the eye will see only a vague continuum and as a result, the eye's inability to distinguish small, low-contrast objects or to recognize slow density gradiants makes it useless insofar as detailed analysis of radiographic film is concerned.

A microdensitometer has been defined as being "a device usually applied in photographic spectroscopy to detect, by light-transmission measurement, spectrum lines recorded on the negative which are too diffuse or faint to be seen by the eye." (Van Nostrand's Scientific Encyclopedia, third edition, January 1958.)

Conventional microdensitometers operate in the one-dimension mode, scanning along a single line of the sample, the presentation usually being a graph of optical-density (or transmission) versus displacement of the probing light beam. To map a two-dimensional pattern using this type of instrument, it is necessary to make a series of parallel scans and then construct contours by transferring equi-density points to their appropriate X and Y positions on a display. This procedure is usually a very time consuming one, especially if the investigator must convert photographic density to object brightness and then correct for vignetting by the camera lens at each data point. Although the operation maybe automated by digitalizing the X and Y and density data so that a fully corrected contour map may be compiled with the aid of an electronic computer, it is obvious that the cost of such a computer installation will be excessively high and, as a result, will be out of reach of all but a very few laboratories.

To date, the only other two-dimensional presentation of photometric information known to us that has been made by adapting the microdensitometer to a successive scanning mode of operation appears in an article by O. C. Mohler and A. K. Pierce "A High Resolution Isophotometer," Astrophysics Journal, vol. 125 (1957), p. 285. In the Mohler and Pierce device a negative is light-scanned in a given direction and a recording platen is caused to move in a corresponding direction. The scanning light beam is amplified and fed into a "Speedomax" recorder which has been set-up to detect the phototube output corresponding to prescribed levels of density. Thereafter, as the density changes from one level to another, the recording pen is made to either print or raise off the paper to indicate that another density level has been reached. Since the pen either writes or does not write only when there is a relatively broad density change (whether the density increases or decreases) there is no information present on the isophote that tells the reader the direction of change. Similarly, since a single beam of light is being used, there can be no correction applied to the output which takes into consideration the relation between the exposure given to a light sensitive layer and the density of image obtained after development of the layer (the H and D curve first discussed by Hurter and Driffield, i.e., the intensity-density transfer function of the light-sensitive layer). By the same token, it is known that when fast camera lenses having wide angles are used, there is a reduction in the incident light flux on the film at angles greater than about 10° from the optical axis. These off-axis ray bundles must be compensated to get the correct scene brightness. This phenomenon of loss of light flux is herein termed the off-axis illuminance fall-off effect. Without correcting for the H and D curves of the record film and if necessary, correcting for the illuminance fall-off effect produced by the lens, the results may be erroneous and in certain instances could mask some otherwise important information on the film.

We have developed a simple, relatively inexpensive device based on the microdensitometer principle, that automatically generates two-dimensional plots of equal optical density. By so doing, we are able to show features present on X-ray films, as well as on conventional photographic records, that are not apparent in the usual qualitative determination. The recording device resolves objects of very low contrast, quantitatively showing the point-by-point X-ray transmission and the relation among neighbouring points while suppressing the normal graininess of the X-ray film. In a typical embodiment of our device, a microscope-densitometer scans the negative image with a beam of light and the density increments are printed on a table linked by a pantagraph to the film carrying stage. After writing a complete scan line the instrument stops, returns and advances to a new scan line. A solenoid activated pen prints out the density increments in a three symbol code. Within the limits of a first optical density level the pen drops down and draws a segment of straight solid line along the paper on the write-out stage. Should the density increase, by some fixed increment to a second next higher level, the pen lifts up and leaves a blank for the length of time that the density remains within limits of the second level. Should the density increase to a next higher third level, the pen is made to move up and down, intermittently drawing a series of dots on the paper on the write-out stage for the time interval that the density remains within the third level. Should the density thereafter successively increase to the next higher fourth, fifth and sixth levels, respectively, the pen would successively write a solid line for the fourth level, a blank at the fifth level and a series of dots at the sixth level, the write-out being done in all density levels for the length of time that the density remains within the predetermined levels. Thus, for a constantly increasing density situation, a typical symbol cycle would be dash-blank-dot; dash-blank-dot; etc. while for a scan involving a density decrease, the corresponding symbol cycle would be dash-dot-blank; dash-dot-blank; etc. It should now be readily apparent that an increasing density situation may be easily distinguished from a decreasing density situation in a single scan. In a series of scan traces wherein increments of transparency or other photographic records are scanned, the result is a plot of density information in two dimensions.

Since the successive density increments can be fixed at virtually any value, by choosing small density increments it has been found that the density range of the negative has been spread out giving excellent contrast enhancement.

It is therefore the principal object of the present invention to present an improved microdensitometer capable of automatically producing a two dimensional plot of equidensity information derived from a photographic record.

It is another principal object of the present invention to present an improved microdensitometer capable of automatically producing a two dimensional plot of equidensity information derived from a photographic record while correcting for film density vs. exposure variations, and if desired, also for lens vignetting.

Still another principal object of the present invention is to present an improved microdensitometer capable of resolving objects of very low contrast appearing on photographic records.

A further principal object of the present invention is to present an improved microdensitometer capable of automatically quantitatively showing the point-by-point X-ray transmission characteristics of a photographic record such as an X-ray negative and the relationship among neighbouring points.

Yet a further principal object of the present invention is to present an improved microdensitometer capable of automatically producing a two-dimensional plot of equidensity information derived from a photographic record while supressing the normal graininess of the film material.

The features of our invention which we believe to be novel are set forth with particularity in the appended claims. Our invention itself, however, both as to its organization and method of operation, together with further objects and advantages thereof, may best be understood by reference to the following description taken in conjunction with the accompanying drawings, in which:

FIG. 1 is a partial schematic and block diagram representation embodying the principles of our invention;

FIG. 2 is a partial schematic and block diagram representation showing a means for off-axis illuminance fall-off correction;

FIG. 3A is a single trace of density vs. displacement;

FIG. 3B is a comparison of the density vs. displacement curve and the method of the subject invention wherein each density range has been broken down into decrete steps and each density step assigned a mode of writing;

FIG. 3C is a specimen having the density profile of the trace of FIGS. 3A and 3B displayed in accordance with the teachings of our invention, wherein density and displacement are presented in a coded dimension for a single scan;

Figure 4:
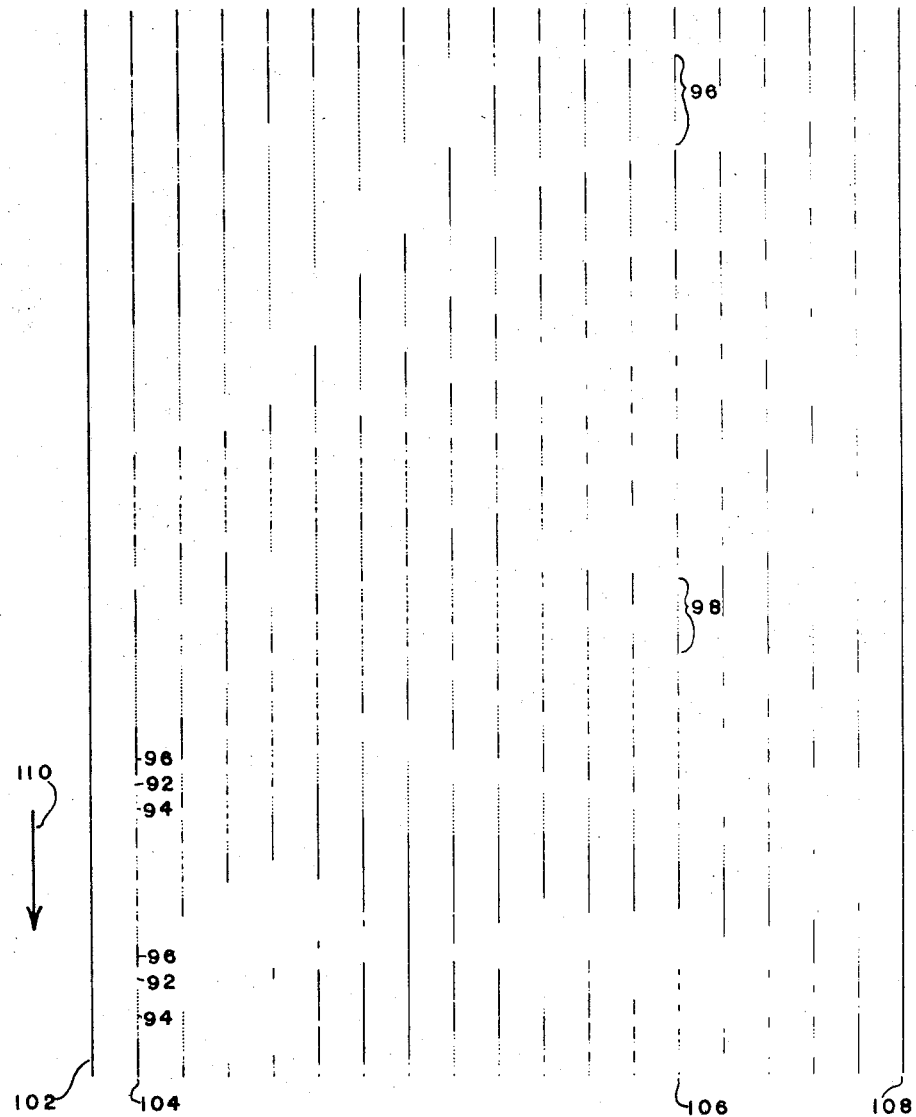
FIG. 4 is a specimen actually drawn by our novel device with widely separated scan lines to show the encoding.

Referring now to FIG. 1 there is shown a microscope type optics consisting of lenses 28.1 and 28.2 for scanning a recorded image (not shown) which may be located in the aperture of record holder 12.1. The scanning in, for example, the X direction is accomplished by means of motor 22.1 which drives lead screw 22.2. Lead screw 22.2 is appropriately mated with write-out or recording platen 20.1 so that rotation of lead screw 22.2 causes recording platen 20.1 to move in one direction. For the sake of illustration, it will be assumed that platen 20.1 is movable up and down, that is, from the top of the page to the bottom, the length of movement being determined by limit switches 78.1 and 78.2 which serve to deenergize motor 22.1 when recording platen 20.1 reaches a prescribed distance in one direction or the other. The record holder 12.1 is linked to the write-out platen 20.1 by means of the pantagraph arm 16.1 having pins 16.2 and 16.3 located at the ends thereof. Pin 16.3 fits into the aperture of the extension 20.2 of recording platen 20.1 while pin 16.2 fits into the aperture of the extension 12.2 of the record holder 12.1. The pantagraph arm 16.1 is shown as pivoting about point 18.1, however a greater or lesser magnification of the record made on platen 20.1 is possible by relocating the pivot point to apertures 18.2 or 18.3, for example.

Thus, as recording platen 20.1 is caused to move in one direction (the X direction) record holder 12.1 will also move in a corresponding direction at a reduced ratio depending upon which of the apertures (18.1, 18.2, or 18.3) is the pivot point about which the pantagraph arm rotates.

Scanning of the record holder 12.1 in the Y direction (left and right) is accomplished by means of step motor 14.2 and lead screw 14.1, which lead screw is threaded and mates in the extension 12.3 of record holder 12.1. Simultaneous with the movement imparted by motor 14.2, step motor 76.1 drives lead screw 76.2 to set the position in the Y direction of the writing pen 82 relative to the recording platen 20.1, and with it solenoid 80, which determines the writing mode of the pen. Appropriate leads couple both motors (14.2 and 76.1) to the position sensing portion of box 72 which derives its operating potential by means of terminals 74. The position sensing mechanism (not shown) provides another source of magnification in the other (i.e., the Y) direction. That is, motors 14.2 and 76.1 do not necessarily have to advance holder 12.1 and platen 20.1 the same distance but instead, if for example motor 76.1 advances pen 82 one distance greater than the distance that motor 14.2 is advanced record holder 12.1, a magnification will be achieved of the record made on the platen 20.1 relative to the image being scanned on holder 12.1, in the Y direction.

Having now provided the relative motions in the X and Y directions for both the record holder and the recording platen, there is further provided the scanning light source system. The light is generated from source 24 and proceeds along beam paths 30.1 and 30.2. Scanning beam 30.1 is reflected off a surface of mirror 26.1, passing through lens 28.2, through the record being scanned and thence through lens 28.1. Thereafter, it proceeds to mirror 26.2 where it is again reflected to pass through an exit slit 84, the dimensions and position of which may be altered by screws 86.1 and 86.2. Exit slit 84 sets the exact dimensions of the scanning beam 30.1 at this point in the beam path. After passing through exit slit 84, scanning beam 30.1 is then reflected off of mirror 26.5 whereupon it is collected and focused by lens system 32.1 on photomultiplier 36. Simultaneous with the forming of beam 30.1, beam 30.2 is formed and directed by reflection from mirror 26.3 and up through the optical density transmission, here shown as an H and D wedge 68. While the wedge has been here illustrated as a wedge having a physical dimension which changes along its length, it should be understood that this is representative of a light wedge with continuously varying shades of grey and is comparable in all respect to a photographic grey scale. The operation of wedge 68, with respect to the overall system, will be described in detail hereinafter.

Having passed through wedge 68, beam 30.2 is then reflected off mirror 26.4 and mirror 26.6 to be collected and focued by lens system 32.2 on photomultiplier 36.

Mortor 38, driven by a source of 60 cycle power applied to terminals 40, is a synchronous motor driving disc 34.1 having apertures 34.2 and 34.3 located therein. The positions of apertures 34.2 and 34.3 are arranged so that each aperture will pass only one light beam. Since the motor 38 is synchronous, the pulse rate of each beam wil be about 60 cycles. Thus, as the disc 34.1 rotates light beams 30.1 and 30.2 are alternately allowed to fall on photomultiplier 36 which photomultiplier is shown having the usual dynodes therein. By providing this 60 cycle chopping action, the intensity of the beams 30.1 and 30.2 may be compared in a comparator portion of box 42 which box derives its power from a source connected to terminals 44. If the intensity of one beam is greater than the intensity of the other, an appropriate signal is fed from box 42 to servo-motor 70.1 which rotates the sheave 70.2 in an oppropriate direction. Thus, if for example, beam 30.1 (the scanning beam passing through the recorded image) has a greater intensity than the beam passing through wedge 68, the signal being fed to servomotor 70.1 is such that sheave 70.2 is rotated in a counterclockwise direction causing beam 30.2 to pass through a less dense portion of wedge 68. This shifting of wedge 68 will continue until beams 30.1 and 30.2 have equal intensities presented to photomultiplier 36, for each section of the record being scanned.

Wedge 68 is coupled to sheave 70.2 by means of belt 66 which also drives a commutator switch mechanism in the form of code wheel 62. Thus, it is seen that the point where light-beam 30.2 passes through wedge 68 will determine the position of code wheel 62. Contacts 64.1 and 64.2 are affixed to slip rings 60.1 and 60.2 repsectively of contact wheel 60.3, and are movable relative to code wheel 62. The slip rings 60.1 and 60.2 have connections thereon which are connected back through coded pulsing means 56 to the solenoid 80. Depending upon the combination of spaces on code wheel 62 on which contacts 64.2 or 64.1 rest, coded pulses are sent from means 56 directing solenoid 80 to cause pen 82 to either write a "blank" (that is not write), write a series of "dots" or write a "solid" line. Thus, the scanning beam of light 30.1 passing through varying density portions of the recorded image, causes the wedge to oscillate back and forth in accordance with the changes in density of the recorded image rotating code wheel 62 which feeds information to coded pulse means 56 to determine a coded sequence that may be easily recognized as either increasing or decreasing density.

As is noted above, the wedge 68 is illustrated as an H and D wedge. This wedge is one in which the displacement of density points along the wedge follows a curve which is analogous to the density-intensity transfer function of the photographic material on which the recorded image under examination is made. We have made such wedges by exposing photographic film through a linear continuous wedge, and developing the film to the appropriate contrast to fit the H and D curve of the emulsion of the photographic material on which the recorded image under examination is made.

If no corrections have to be applied the device will perform to provide a coded density plot. However, it is frequently necessary to correct for off-axis illuminance fall-off. This is done by means of control 46 consisting of a disc 52 having concentric, circular, conductive electric conductors thereon, each conductor connected to a variable resistor 50 and all the resistors connected together and to a source of power 54. Contactor 48.1, affixed to the recording platen 20.1 by means of arm 48.2, traverses across the vignetting control disc 62. Contactor 48.1 is connected by means of a lead to servo-motor 58.

For a more detailed explanation of the operation and functioning of control 46, reference is now made to FIG. 2 wherein the contactor 48.1 is shown to traverse across the concentric conductors 52.1 along the dotted path 88. Variable resistors 50, each having one end connected to a concentric conductor and having all other ends connected to a common lead are connected to source 54 and provide means for calibrating our system for correction of off-axis illuminance fall-off effect. It will thus be obvious that as contactor 48.1 traverses from the bottom to the top of disc 52, for example, different voltages are applied to servo-motor 58 (depending on the position of contactor 48.1 and recording platen 20.1) causing servo-motor 58 to step around in a given pattern, thereby correcting for any illuminance fall-off that may occur. It should be here stated that contact wheel 60.3 is mounted on the rotating shaft of servo-motor 58. In addition, code wheel 62, mounted concentrically with contact wheel 60.3, is indexed in accordance with the intensity of the beam 30.1, while servo-motor 58 causes contacts 64.1 and 64.2 on contact wheel 60.3 to be counter-rotated with respect to the code wheel 62 to compensate for the illuminance fall-off effect. Contactor 48.1 riding over disc 52, successively contacts each of the 60 concentric conducting rings 52.1. Potentiometers 50, are preset to apply a correcting voltage to servo-motor 58. In operation the servo-motor 58 counterrotates the commutator 60.3 and contacts 64.1 and 64.2, which contacts determine the writing code signal applied to solenoid 80. Since the code signal applied to solonoid 80 determines the writing action of pen 82, the pen is thus caused to print in a manner to restore the losses in lens transmission occurring toward the outer edges of the field.

Referring now to FIGS. 3A, 3B and 3C for a pictorial representation of the code utilized in our device, it will be seen that FIG. 3A is a plot of density vs. displacement. In FIG. 3B, the density vs. displacement curve of 3A has been superimposed upon a series of horizontal coded bars. In FIGS. 3B and 3C, each coded bar occupies a space of about 0.1 (arbitrary) density unit and each density unit is encoded with either a "space," a "dot" or a "line." Thus, as the curve passes through the 0 to 0.1 "space" portion, a space 92 appears in the plot 90 representing a single scan across the recorded image under examination. As the curve progresses upwardly through the "dot" portion, indicating the density ranging from 0.1 to 0.2, a series of "dots" 94 is presented on the plot. Thereafter, the curve passes through the "line" portions, as indicated by a density ranging from 0.2 to 0.3, a "line 96" is formed in the plot 90. Thereafter, a succession of "space" 92.1, "dots" 94.1, "line" 96.1, "space" 92.2, "dots" 94.2 are all successively laid out on the plot line 90. At this point on the curve, the density decreases and returns to a point just below a density level of 0.1. In progressing back through the decreasing density encoded portion it will be seen that area 96 shows "space," "line," "dot," "space," "line," "dot," "space" until the density vs. displacement curve starts to rise again whereupon the original "space," "dot," "line," code is written, as indicated in area 98. In the following decreasing density portion of the curve at area 100, there is indicated the code having the order of "dot," "space," "line."

Referring now to FIG. 4 there is shown a specimen actually drawn by a system of the invention, but with widely separated scan lines to show the encoding as illustrated in FIG. 3C. In FIG. 4 it should be noted that lines 102 and 108, solid lines throughout the length of the scan, indicate the outer limits of the recorded image being scanned, with the direction of the scan being indicated by arrow 110. Referring now to line 104, there will be seen two areas where, in succession, a "line" 96, a "space 92" and "dot" 94 are shown to indicate increasing density. Referring to scan line 106 there is shown an area 96 having a "line," "dot," "space" sequence which indicates a decreasing density as well as an area 98 having a "space," "dot," "line" sequence which indicates an increasing density. Thus, on a single line 106 there is shown both decreasing and increasing densities.

Figure 5A:
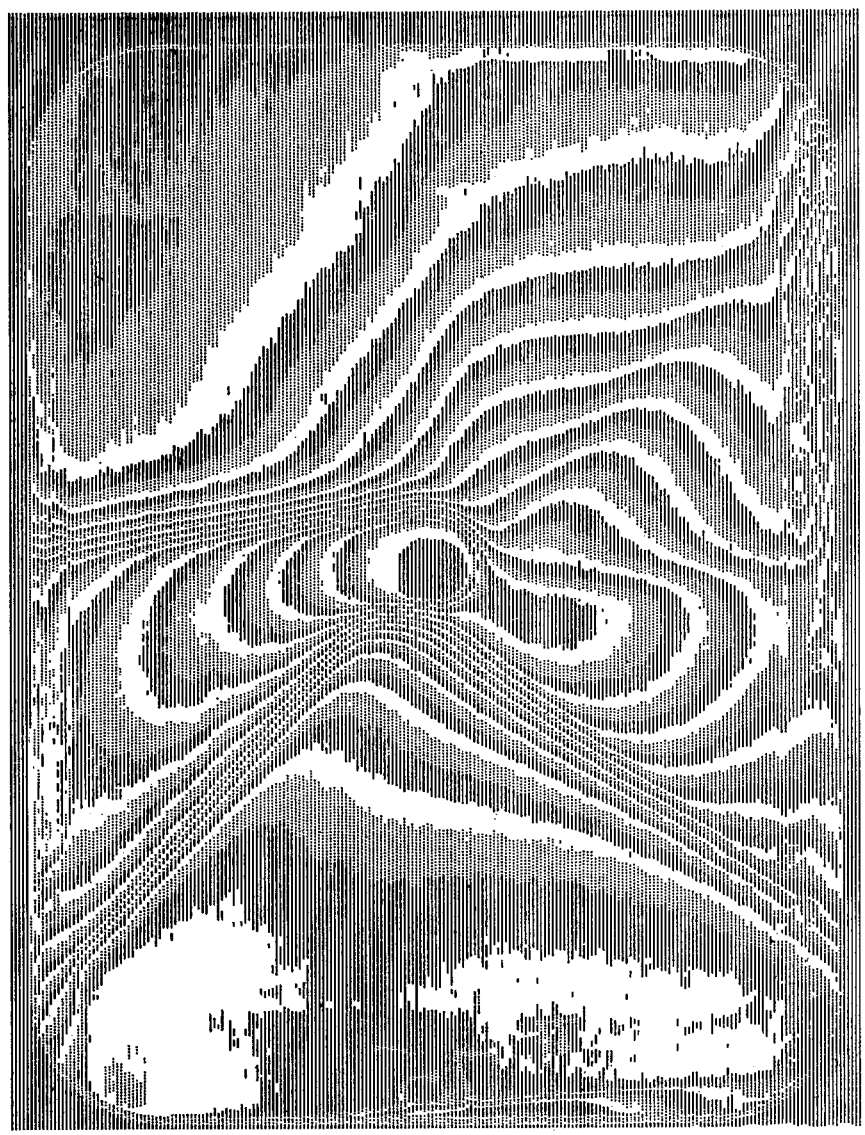
FIG. 5A is a 10× magnification of an actual drawing made by our novel device showing the intensity distribution on an X-ray film negative exposed to X-rays having a frequency of about 0.125 A., through a stepped circular staircase, copper attenuator in which each step was designed to attenuate about 10% of the incident radiation.

Referring now to FIG. 5A there is shown an actual drawing of the same specimen as in FIG. 4 made by a system according to the invention, with the intervening lines of FIG. 4 filled in. For the sake of clarity and for the sake of preserving this drawing as an exhibit, numbers have been omitted therefrom but, a close observation will indicate that each scan line is in fact made up of a series of "space," "dot," "line" or "line," "dot," "space" codes indicating an increasing or decreasing density, respectively.

Figure 5B:
FIG. 5B is the actual size of the negative from which the drawing of FIG. 5A was made.

Comparing FIGS. 5A and 5B there is shown in FIG. 5B the actual size of the recorded image from which FIG. 5A was made. This is included to show that magnification is possible both along the length and along the width of the image (i.e., in the X and Y directions). As will be apparent, however, from the foregoing description, magnification in each direction can be achieved independently of magnification, or lack of magnification, in the other direction.

While we have described what is presently considered the preferred embodiment of our invention, it will be obvious to those skilled in the art that various other changes and modifications may be made therein without departing from the inventive content. For example, while the illuminance fall-off control disc 52 is made circularly symmetric because of the symmetry of the illuminance fall-off correction, it is possible to make corrector elements with other geometries to correct for other types of light losses having other geometric forms. It is deemed in the appended claims to cover all such changes and modifications as fall within the true spirit and scope of our invention.

What is claimed is:

1. An isophotometric apparatus for measuring and recording in two-dimensions changes in the density of a photographic transparency exhibiting off-axis illuminance fall-off effects, comprising:

light source and light-responsive examining means for making an elemental region-by-region examination of said transparency, said means including an optical density wedge movable relative to a beam from said source against which to evaluate the density of said transparency at each elemental region thereof, said wedge being a non-linear optical attenuator in which the displacement of density points along the wedge follows a curve which is analogous to the density-intensity transfer function of the transparency under measurement;

first support means for said transparency associated with said examining means for effecting elemental region-by-region scanning of said transparency;

second support means for an output record medium, and marking means associated with said support means for making an output record;

means to impart corresponding motions in a common two-dimensional coordinate system of said first support means relative to said examining means and of said second support means relative to said marking means, respectively;

said marking means including commutator means, switch means and a marking instrument movable toward and away from said output record medium through mode selector means under control of said switch means, said commutator means having first contactor means for cooperating with said switch means to select a first of said modes, second contactor means for cooperating with said switch means to select a second of said modes, and third contactor means for coopearting with said switch means to select a third of said modes;

means linked with said wedge for effecting relative motion between said commutator means and said switch means to select one of said modes in accordance with the position of said wedge relative to said beam in said examining means to change said marking means from one to another of said modes upon change in the density of said transparency by a prescribed amount, the sequence of said mode changes indicating the direction of change in the density of said transparency; and means to compensate said marking means for said fall-off effect, said last-named means having a sensor element associated with said second support means to sense the distance of said scanning means from the elemental region of said transparency corresponding to the axis of said lens, and operator means responsive to said sensor element and calibrated to correct said marking means for the loss of light flux for non-axial rays incident upon the medium from which said transparency was made, said operator means being operative to effect relative motion between said commutator means and said switch means independent of the first-named relative motion due to said wedge.

2. Apparatus for measuring and for producing two-dimensional records of incremental differences in a particular optical characteristic of an examined specimen, comprising:

optical examining means for sequentially examining adjacent elemental regions of the specimen to detect differences in said optical characteristic, said examining means including a light source and photodetection means for producing an output characterizing the detected differences in said optical characteristic;

first motive means for effecting relative movement between said optical examining means and the specimen;

write-out means for producing a quantized two-dimensional record indicative of the detected differences on a recording material, said write-out means having at least three different output modes, each producing a distinguishable record code;

second motive means for effecting relative movement between said write-out means and the recording material;

means for correlating said first and second motive means to produce an effective correlated scan of the specimen by said optical examining means and of the recording material by said write-out means; and control means responsive to said output from said optical examining means for changing said write-out means from one of said modes to another of said modes in accordance with a detected difference in said optical characteristic which exceeds a predetermined level, the sequence of said mode changes indicating a particular direction of change of said optical characteristic.

3. For operation in response to a signal derived by optical examining means having cooperating light source and photodetection means for sequentially examining elemental regions of a scanned specimen to detect differences in an optical characteristic of the specimen, recording apparatus comprising:

write-out means including marking means for producing on a recording material a quantized two-dimensional record indicative of said differences in said optical characteristic, said write-out means having at least three distinct output modes, each mode producing a distinguishable record code;

motive means for effecting relative movement between said write-out means and the recording material to effectively cause said write-out means to scan the recording material;

means for effectively synchronizing the write-out produced by said write-out means with the input signal information;

said write-out means including control means responsive to said input signal for changing said write-out means from one of said modes to another of said modes in accordance with a detected difference in said optical characteristic which exceeds a predetermined level, the sequence of said mode changes indicating a particular direction of change of said characteristic.

4. In a microdensitometer comprising optical scanning means for making an elemental region-by-region scan of a density characteristic of a scanned photograph record including light source means for establishing a signal light beam attenuated by said density characteristic of said photographic record and a reference beam unattenuated by said record, and photoresponsive means for detecting the relative intensity levels in said signal and reference beams, the improvement comprising:

a variable density optical attenuating filter variably positionable in said reference beam to serve as a standard for comparison with the density of the instantaneous scanned element of the record, said filter having a density versus length characteristic which is substantially matched to the density versus log exposure characteristic of the scanned record such that the position of said filter in said reference beam when said photoresponsive means detects an intensity balance between said signal and reference beams is a direct measure of the radiation intensity originally exposing said record; and output means for producing an output signal indicative of the position of said filter in said reference beam.

5. The apparatus defined in claim 3 wherein said specimen is a photographic record which may exhibit an off-axis illuminance fall-off effect and wherein said apparatus includes:

sensing means responsive to said motive means for monitoring the radial displacement of an element being recorded from a reference record point;

control means responsive to said sensing means and coupled to said marking means for adjusting the output of said marking means to compensate for said illuminance fall-off effect.

6. The apparatus defined by claim 3 wherein said means for correlating said first and second motive means includes adjustable means for adjusting the relative rates of movement effected by said first and second motive means such that the record produced by said write-out means is magnified relative to the examined specimen.

References Cited

UNITED STATES PATENTS

| 2,478,406 | 8/1949 | Lamb | 88—14 |
| 3,270,348 | 8/1966 | Lesage et al. | 88—14 |

OTHER REFERENCES

Kosofsky, Photogrammetric Engineering, "Investigation Of An Integrated Mapping System," vol. XXIV, No. 3, pp. 458–461, 88/14 vc.

JEWELL H. PEDERSEN, *Primary Examiner.*

WARREN A. SKLAR, *Assistant Examiner.*

U.S. Cl. X.R.

250—219; 346—33